United States Patent
Nonaka et al.

(10) Patent No.: US 8,364,783 B2
(45) Date of Patent: Jan. 29, 2013

(54) RELAY SERVER, METHOD OF CONTROLLING OPERATION OF SAME, AND PROGRAM FOR CONTROLLING OPERATION OF SAME

(75) Inventors: Shunichiro Nonaka, Tokyo (JP); Hiroshi Ohtani, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 90 days.

(21) Appl. No.: 13/100,127

(22) Filed: May 3, 2011

(65) Prior Publication Data

US 2011/0276660 A1 Nov. 10, 2011

(30) Foreign Application Priority Data

May 6, 2010 (JP) ................................. 2010-106136

(51) Int. Cl.
G06F 15/167 (2006.01)
(52) U.S. Cl. ....................................... 709/218; 709/219
(58) Field of Classification Search .................. 709/218, 709/219
See application file for complete search history.

(56) References Cited

FOREIGN PATENT DOCUMENTS

JP 3964266 B2 6/2007

*Primary Examiner* — Adnan Mirza
(74) *Attorney, Agent, or Firm* — McGinn IP Law Group, PLLC

(57) ABSTRACT

Security is maintained in a data communication system while minimizing the frequency with which communication is carried out. A data transmitting server and a relay server communicate based upon https utilizing port 443 of a firewall. When query data is transmitted from the data transmitting server to the relay server, the relay server determines whether there is a data request from a mobile telephone within a fixed period of time. If there is a data request from the mobile telephone within the fixed period of time, the requested data is transmitted from the data transmitting server to the relay server in response to this data request. This requested data is transferred from the relay server to the mobile telephone.

4 Claims, 6 Drawing Sheets

RELAY SERVER, METHOD OF CONTROLLING OPERATION OF SAME, AND PROGRAM FOR CONTROLLING OPERATION OF SAME

BACKGROUND OF THE INVENTION

1. Field of the Invention

This invention relates to a relay server, a method of controlling the operation of the relay server and a program for controlling the operation of the relay server.

2. Description of the Related Art

A data transmitting server or the like for transmitting data requires that security be enhanced by restricting external access. Various methods of enhancing security are available. For example, one method connects a data transmitting server and another server by a private line and performs data communication utilizing the private line. Such an arrangement provides very robust security but involves a great deal of labor and very high cost. Further, although security is relatively high in a VPN (Virtual Private Network) that utilizes a router, this expedient requires detailed setting of a firewall and therefore is labor-intensive. Although there is an arrangement in which a software VPN module is placed in front of the data transmitting server, security declines because it is required to open the firewall port.

There is also a connection support server for connecting a requesting terminal and a responding terminal (see the specification of U.S. Pat. No. 3,964,266). In this arrangement a TCP connection from the responding terminal is maintained and data for maintaining the TCP connection is transmitted periodically from the connection support server to the responding terminal. A drawback, however, is that the data for maintaining the TCP connection must be transmitted periodically.

SUMMARY OF THE INVENTION

The present invention seeks to minimize the frequency with which communication is carried out.

A relay server according to the present invention comprises: a timekeeping device (timekeeping means) which, in accordance with receipt of query data, which is transmitted from a data transmitting server and queries as to the existence of a data transmission request from a data terminal that has been authenticated, via a port of a firewall which allows a data transmission from the data transmitting server to the relay server but which allows data communication from the relay server to the data transmitting server during a fixed period of time in response to transmission of data from the data transmitting server to the relay server, is for starting clocking of the fixed time period; a determination device (determination means), responsive to receipt of the query data transmitted from the data transmitting server, for determining whether there has been a data transmission request from the data terminal during the clocking of the fixed time period by the timekeeping device; a first transfer device (first transfer means), responsive to a determination by the determination device that there has been a data transmission request from the data terminal, for transferring the data transmission request from the data terminal to the data transmitting server; a second transfer device (second transfer means) for transferring, to the data terminal, data requested by the data terminal transmitted from the data transmitting server in response to transfer of the data transmission request from the data terminal to the data transmitting server by the first transfer device; and a transmitting device (transmitting means), responsive to end of clocking of the fixed time period by the timekeeping device without a data transmission request from the data terminal being determined by the determination device, for transmitting data, which indicates absence of a data transmission request from the data terminal, to the data transmitting server.

The present invention also provides an operation control method suited to the above-described relay server. Specifically, the present invention provides a method of controlling operation of a relay server comprising the steps of: in accordance with receipt of query data, which is transmitted from a data transmitting server and queries as to the existence of a data transmission request from a data terminal that has been authenticated, via a port of a firewall which allows a data transmission from the data transmitting server to the relay server but which allows data communication from the relay server to the data transmitting server during a fixed period of time in response to transmission of data from the data transmitting server to the relay server, starting clocking of the fixed time period; in response to receipt of the query data transmitted from the data transmitting server, determining whether there has been a data transmission request from the data terminal during the clocking of the fixed time period; in response to a determination that there has been a data transmission request from the data terminal, transferring the data transmission request from the data terminal to the data transmitting server; transferring, to the data terminal, data requested by the data terminal transmitted from the data transmitting server in response to transfer of the data transmission request from the data terminal to the data transmitting server; and in response to end of clocking of the fixed time period without a data transmission request from the data terminal being determined, transmitting data, which indicates absence of a data transmission request from the data terminal, to the data transmitting server.

The present invention further provides a computer-readable program for implementing the above-described method of controlling the operation of the relay server.

In accordance with the present invention, query data querying as to the existence of a data transmission request from a data terminal is transmitted from a data transmitting server to a relay server via a port of a firewall which allows a data transmission from the data transmitting server to the relay server but which allows data communication from the relay server to the data transmitting server during a fixed period of time in response to a data transmission from the data transmitting server to the relay server. Clocking of the fixed period of time starts when the query data is received by the relay server. Processing is executed to determine whether there is a data transmission request from the data terminal during the clocking of the fixed time period by the timekeeping device. If it is determined that there has been a data transmission request from the data terminal, then the data transmission request from the data terminal is transferred to the data transmitting server. When this occurs, data conforming to the data transmission request is transmitted from the data transmitting server and the data is transferred from the relay server to the data terminal. If clocking of the fixed time period by the timekeeping device ends without a determination by the determination device that there has been a data transmission request, then data indicating absence of a data request from the data terminal is transmitted from the relay server to the data transmitting server.

In accordance with the present invention, data communication is carried out between a data transmitting server and a relay server via a port of a firewall which allows a data transmission from the data transmitting server to the relay server but which allows data communication from the relay server to the data transmitting server during a fixed period of time in response to a data transmission from the data transmitting server to the relay server. This means that data cannot be transmitted unilaterally from the relay server to the data transmitting server. Even in this case if there is a data transmission request from the data terminal during clocking by the timekeeping device, the data transmission request will be transferred from the relay server to the data transmitting server in response to this data transmission request. As a result, data can be transmitted from the data transmitting server to the data terminal promptly. The frequency with which communication is performed is not high since data for maintaining the communicating state need not be transmitted periodically between the data transmitting server and the relay server.

The query data is transmitted from the data transmitting server to the relay server based upon https (Hypertext Transfer Protocol Security) via port #443 of the firewall.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
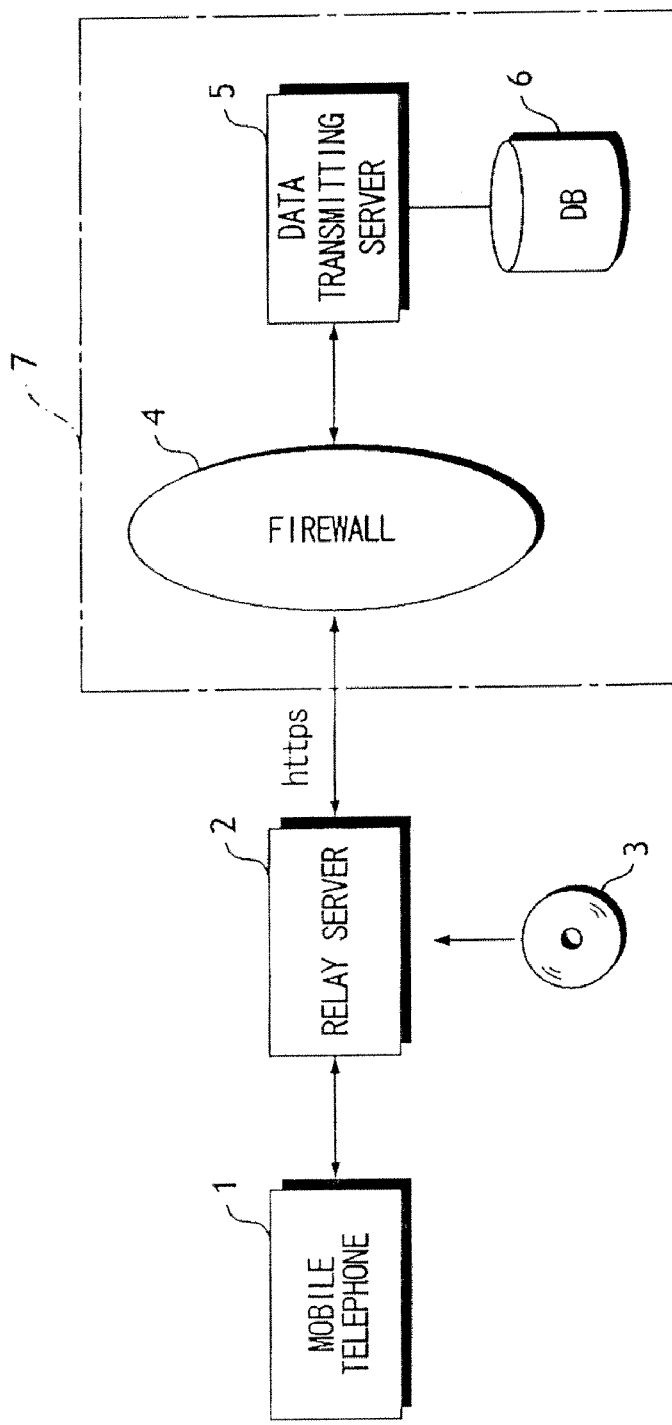
FIG. 1 is a block diagram illustrating the electrical configuration of a data communication system.

FIG. 1 is a block diagram illustrating the electrical configuration of a data communication system.

The data communication system is such that a mobile telephone (data terminal) 1 and a data transmitting server 5 communicate via a relay server 2.

The data transmitting server 5 is connected to a LAN (Local-Area Network) within a company 7. A database 6 storing data that will be transmitted to the mobile telephone 1 in accordance with a request from the mobile telephone 1 is connected to the data transmitting server 5. The data transmitting server 5 communicates with the relay server 2 via a firewall 4 installed within the company 7.

In this embodiment, data communication is carried out via the firewall 4. The firewall 4 allows data transmission from the data transmitting server 5 to the relay server 2. However, from the relay server 2 to the data transmitting server 5, with respect to a data transmission request from any port (let this be port N) of the data transmitting server 5 to port 443 of the relay server 2, the firewall 4 allows data transmission from the port 443 of the relay server 2 to the N port of the data transmitting server 5, only during a fixed period of time, as the response to this request. This communication utilizing port 443 uses https (Hypertext Transfer Protocol Security). Even if a data request from the relay server 2 to the data transmitting server 5 is attempted regardless of a data transmission from the data transmitting server 5 to the relay server 2, data cannot be transmitted from the relay server 2 to the data transmitting server 5.

A CD-ROM (Compact Disk-Read-Only Memory) 3 storing a program for controlling operation, described later, is loaded in the relay server 2 and the operation is carried out by installing this program in the relay server 2. Naturally, the operation program may be pre-installed in the relay server 2 or may be provided via a network.

Although the single mobile telephone 1 is illustrated in FIG. 1, it goes without saying that a number of mobile telephones can communicate with the relay server 2.

Figure 2:
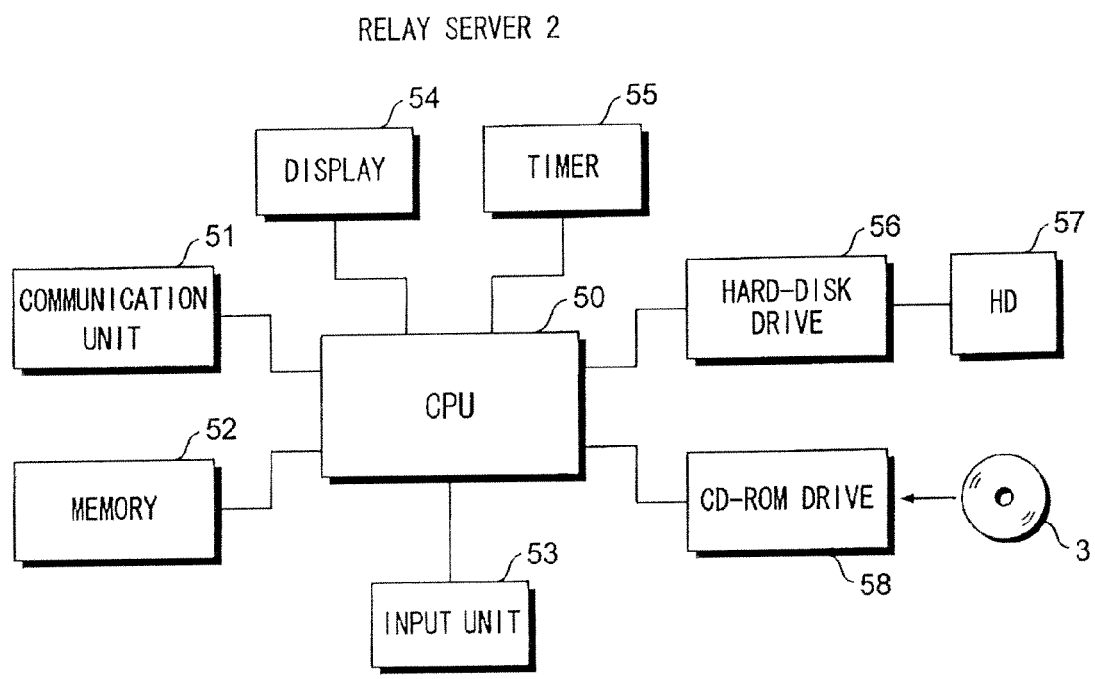
FIG. 2 is a block diagram illustrating the electrical configuration of a relay server.

FIG. 2 is a block diagram illustrating the electrical configuration of the relay server 2.

The overall operation of the relay server 2 is controlled by a CPU 50.

The relay server 2 is provided with a CD-ROM drive 58 that reads the operation program stored in the above-mentioned CD-ROM 3. By reading the operation program from the CD-ROM 3 using the CD-ROM drive 58, the read operation program is installed in the relay server 2.

The relay server 2 further includes a communication unit 51 for communicating with the mobile telephone 1 and data transmitting server 5; a memory 52 for storing data temporarily; an input unit 53 such as a keyboard and mouse; a display device 54; a timer 55; a hard disk 57; and a hard-disk drive 56 for accessing the hard disk 57.

Figure 3:
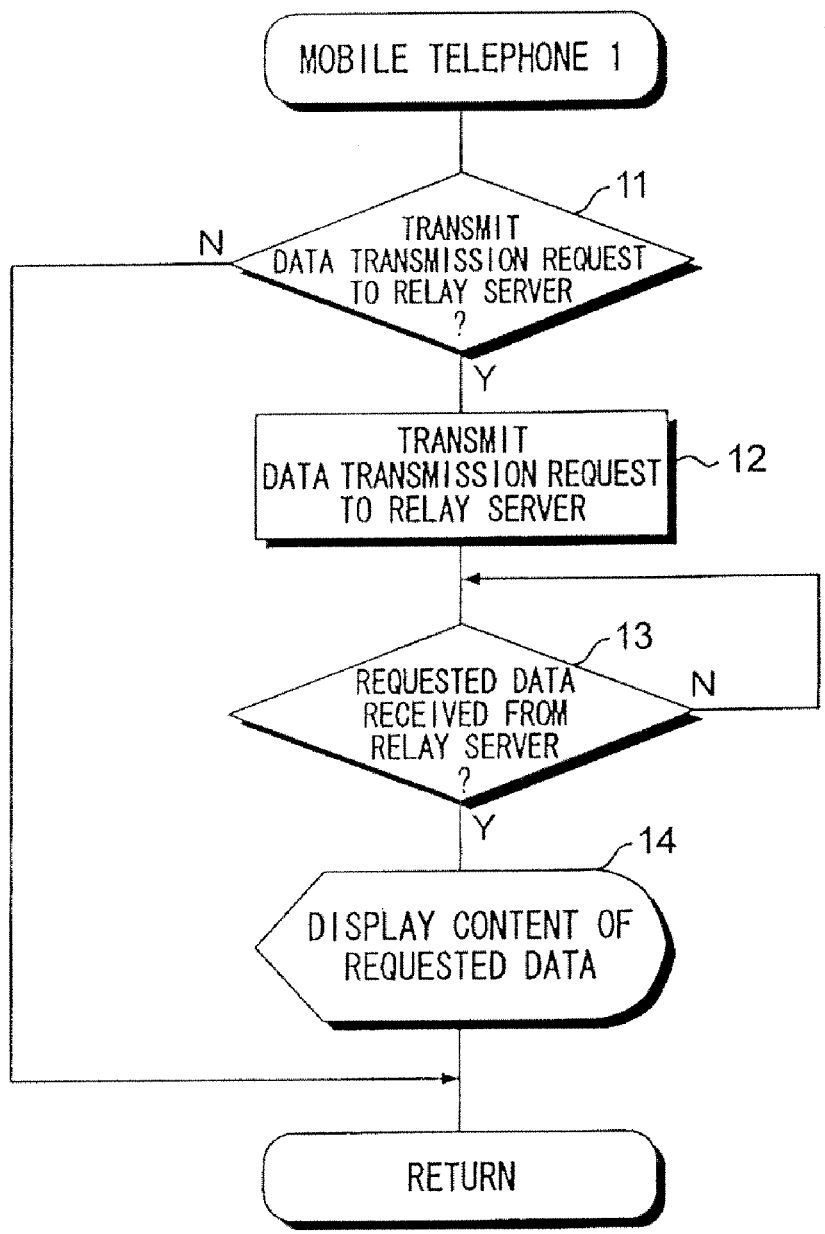
FIG. 3 is a flowchart illustrating processing executed by a mobile telephone.
Figure 4:
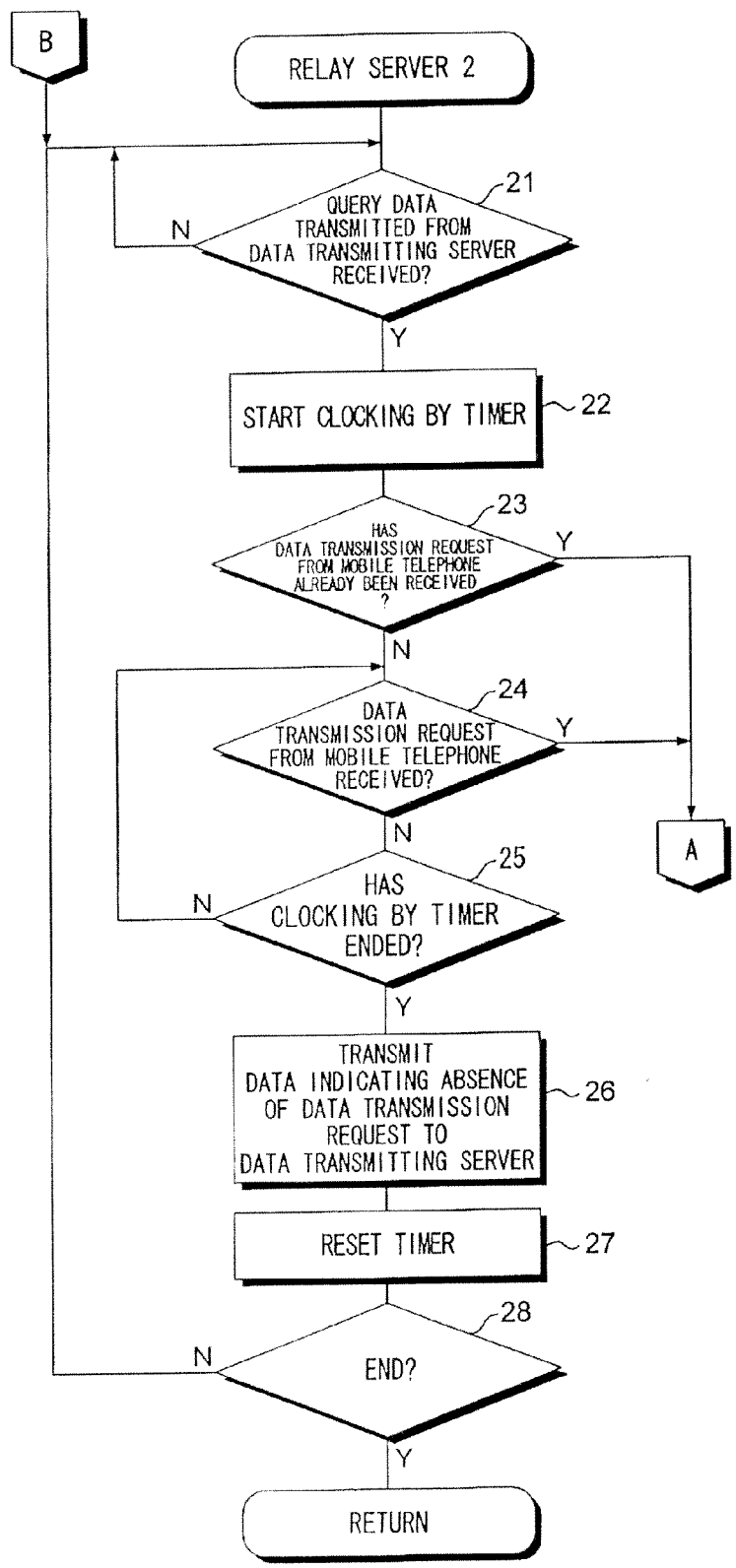
FIGS. 4 and 5 are flowcharts illustrating processing executed by a relay server.
Figure 5:
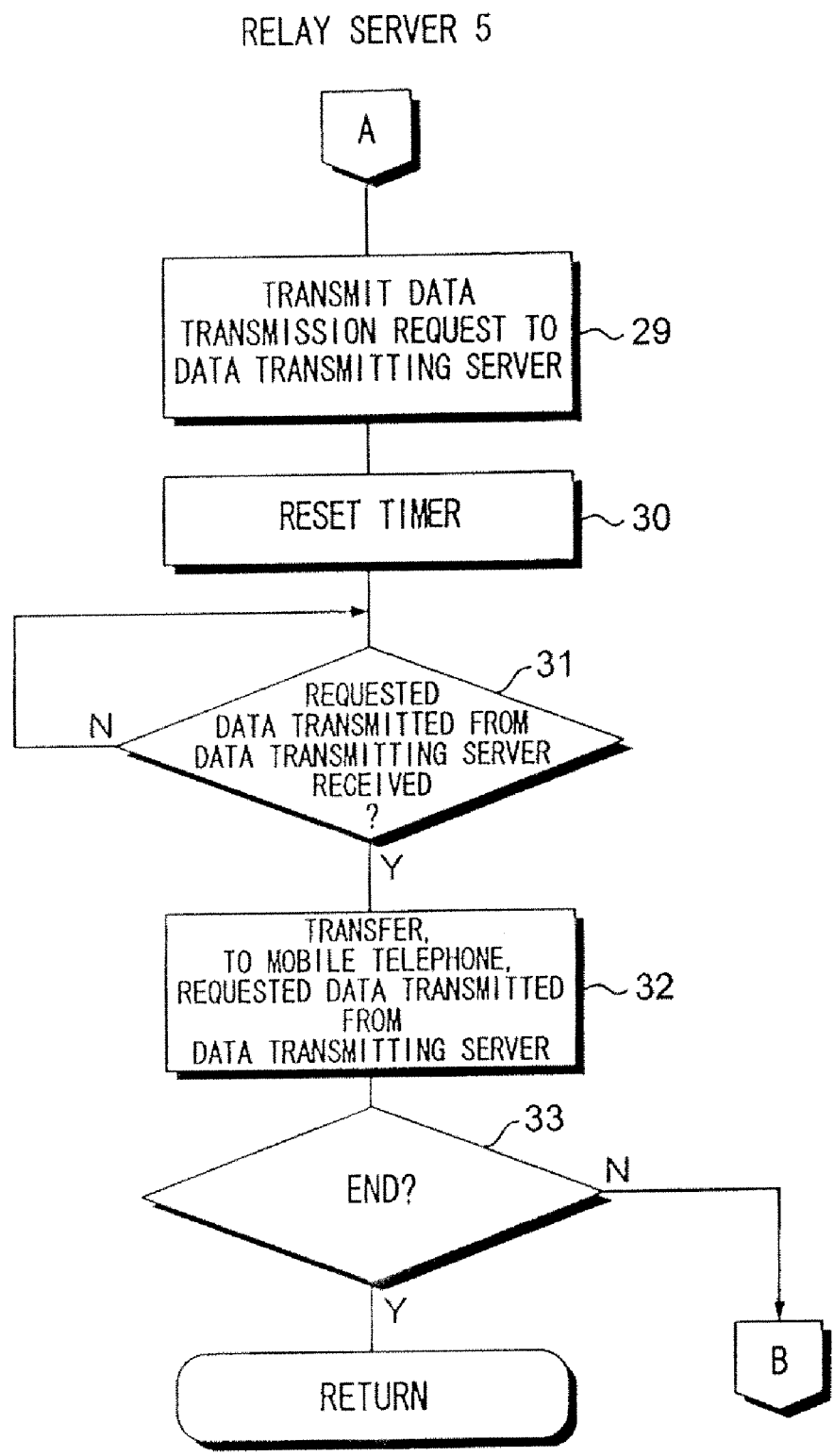
Figure 6:
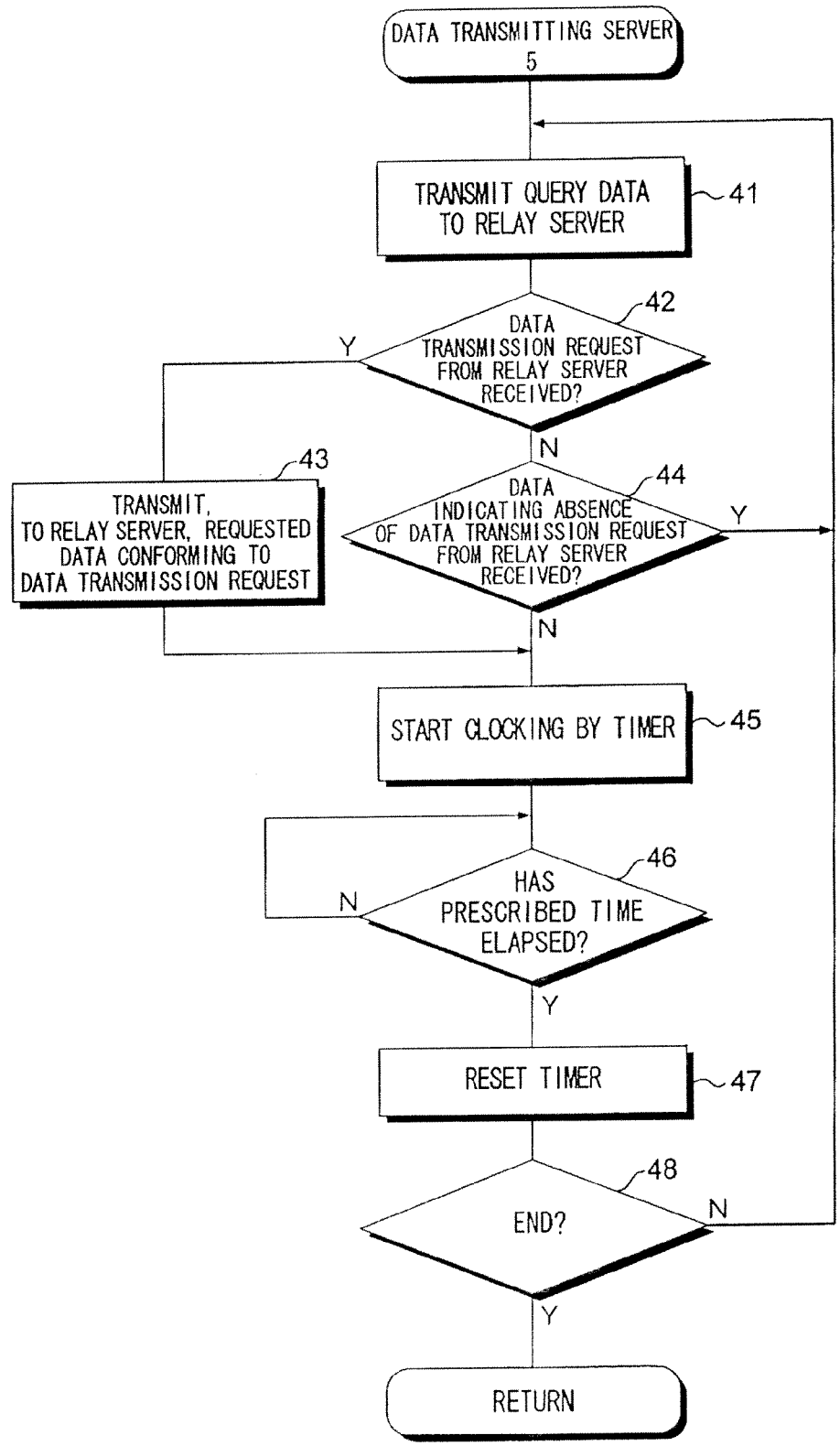
FIG. 6 is a flowchart illustrating processing executed by a data transmitting server.

FIGS. 3 to 6 are flowcharts illustrating processing executed by this data communication system, in which FIG. 3 is a flowchart of processing executed by the mobile telephone 1, FIGS. 4 and 5 flowcharts of processing executed by the relay server 2, and FIG. 6 a flowchart illustrating processing executed by the data transmitting server 5. In this processing it is assumed that the mobile telephone 1 has been authenticated and that it has the right to access the data transmitting server 5.

In this processing, as mentioned above, query data querying as to the existence of a data transmission request from the mobile telephone 1 is transmitted from the data transmitting server 5 to the relay server 2 via port 443 of the firewall 4 which allows a data transmission from the data transmitting server 5 to the relay server 2 but which allows data communication from the relay server 2 to the data transmitting server 5 during a fixed period of time in response to a data transmission from the data transmitting server 5 to the relay server 2. When the query data is received by the relay server 2, clocking of the fixed period of time is started by the timer 55.

Further, when the query data is received by the relay server 2, first determination processing (which need not necessarily be executed) and second determination processing is executed. The first determination processing determines whether there has been a data transmission request from the mobile telephone 1 after a data transmission from the relay server 2 to the data transmitting server 5, and the second determination processing determines whether there has been a data transmission request from the mobile telephone 1 during the clocking of the fixed time period by the timer 55. If it is determined by the first determination processing or the second determination processing that there has been a data transmission request from the mobile telephone 1, the data transmission request from the mobile telephone 1 is transferred to the data transmitting server 5. When this occurs, data conforming to the data transmission request is transmitted from the data transmitting server 5 and this data is transferred from the relay server 2 to the mobile telephone 1. When clocking of the fixed time period by the timer 55 ends owing to the second determination processing, data indicating that there was no data request from the mobile telephone 1 is transmitted from the relay server 2 to the data transmitting server 5. A data transmission from the data transmitting server 5 to the external relay server 2 is allowed, as in the manner of port 443 of the firewall 4. However, even in the case where, conversely, a data transmission from the external relay server 2 to the data transmitting server 5 is restricted, data requested by the mobile telephone 1 can be transmitted from the data transmitting server 5 to the mobile telephone 1. The details will become clear from the description that follows.

First, processing in a case where a data transmission request is transmitted from the mobile telephone 1 to the relay server 2 will be described ("YES" at step 11 in FIG. 3, and step 12 in FIG. 3).

Since the relay server 2 operates in response to a data transmission from the data transmitting server 5, the relay server 2 is in an access-standby state until query data from the data transmitting server 5 is received (step 21 in FIG. 4). Even in the access-standby state, however, the relay server 2 stores whether a data transmission request has been transmitted from the mobile telephone 1.

When query data that inquires as to the existence of a data transmission request from the mobile telephone 1 is transmitted from the data transmitting server 5 to the relay server 2 (step 41 in FIG. 6) and the query data is received by the relay server 2 ("YES" at step 21 in FIG. 4), clocking of the fixed period of time by the timer 55 starts (step 22 in FIG. 4).

A data transmission request from the mobile telephone 1 is transmitted before the relay server 2 receives query data from the data transmitting server 5. The relay server 2 executes the first determination processing to determine whether this data transmission request has already been received (step 23 in FIG. 4). If the data transmission request from the mobile telephone 1 has already been received ("YES" at step 23 in FIG. 4), the data transmission request is transmitted from the relay server 2 to the data transmitting server 5 (step 29 in FIG. 5). The running timer 55 is reset (step 30 in FIG. 5).

Upon receiving the data transmission request from the relay server 2 ("YES" at step 42 in FIG. 6), the data transmitting server 5 reads from the database 6 the data requested by this data transmission request. The requested data is transmitted from the data transmitting server 5 to the relay server 2 (step 43 in FIG. 6).

When the requested data is transmitted from the data transmitting server 5 to the relay server 2, clocking by a timer in the data transmitting server 5 starts (step 45 in FIG. 6). When a prescribed time period elapses ("YES" at step 46 in FIG. 6), the timer is reset (step 47 in FIG. 6). Since the prescribed period of time will have elapsed from transmission of the requested data to the relay server 2 if a terminate command is not applied to the data transmitting server 5 ("NO" at step 48 in FIG. 6), the query data is transmitted from the data transmitting server 5 to the relay server 2 again (step 41 in FIG. 6). Naturally, it may be so arranged that even in a case where the requested data is transmitted from the data transmitting server 5 to the relay server 2, the query data is transmitted from the data transmitting server 5 to the relay server 2 immediately without waiting for elapse of the prescribed time period.

When the data that has been requested and transmitted from the data transmitting server 5 is received by the relay server 2 ("YES" at step 31 in FIG. 5), the requested data is transferred from the relay server 2 to the mobile telephone 1 (step 32 in FIG. 5). If a terminate command is not applied to the relay server 2 ("NO" at step 33 in FIG. 5), processing returns to that from step 21 onward in FIG. 4.

When the requested data transferred from the relay server 2 is received by the mobile telephone 1 ("YES" at step 13 in FIG. 3), the content of the requested data is displayed on the mobile telephone 1 (step 14 in FIG. 3).

If a data transmission request from the mobile telephone 1 has not been received by the relay server 2 when the query data transmitted from the data transmitting server 5 is received ("NO" at step 23 in FIG. 4), then the second determination processing is executed to determine whether a data transmission request from the mobile telephone 1 has been received after receipt of the query data (step 24 in FIG. 4). The second determination processing at step 24 in FIG. 4 is repeated until clocking by the timer 55 ends (step 25 in FIG. 4).

If a data transmission request is transmitted from the mobile telephone 1 to the relay server 2 ("YES" at step 11 in FIG. 3, step 12 in FIG. 3) and, moreover, the data transmission request from the mobile telephone 1 is received by the relay server 2 ("YES" at step 24 in FIG. 4) before clocking by the timer 55 ends ("NO" at step 25 in FIG. 4), then the requested data is transmitted from the data transmitting server 5 to the mobile telephone 1 (steps 29 to 32 in FIG. 5, steps 42 to 47 in FIG. 6), as described above.

Described next will be processing in a case where a data transmission request is not transmitted from the mobile telephone 1 to the relay server 2 ("NO" at step 11 in FIG. 3).

Query data is transmitted from the data transmitting server 5 to the relay server 2 (step 41 in FIG. 6) irrespective of any data transmission request from the mobile telephone 1 to the relay server 2.

When the query data transmitted from the data transmitting server 5 is received by the relay server 2 ("YES" at step 21 in FIG. 4), timekeeping by the timer 55 of the relay server 2 starts (step 22 in FIG. 4). If a data transmission request from the mobile telephone 1 is not received by the relay server 2 ("NO" at both of steps 23 and 24 in FIG. 4) even when timekeeping by the timer 55 ends ("YES" at step 25 in FIG. 4), data indicating absence of a data transmission request from the mobile telephone 1 is transmitted from the relay server 2 to the data transmitting server 5 (step 26 in FIG. 4). The timer 55 of the relay server 2 is reset (step 27 in FIG. 4) and, if a terminate command is not applied ("NO" at step 28 in FIG. 4), processing returns to that at step 21 in FIG. 4. Even though a data transmission request from the mobile telephone 1 is not received when query data from the data transmitting server 5 is received by the relay server 2, an indication to the effect that a request has not been received is not transmitted from the relay server 2 to the data transmitting server 5 immediately. Rather, data indicating that a data transmission request has not been received is transmitted from the relay server 2 to the data transmitting server 5 in a case where there was no data transmission request from the mobile telephone 1 even though elapse of the fixed time period as clocked by the timer 55 was awaited. As a result, needless transmission of data between the relay server 2 and the data transmitting server 5 can be prevented.

When the data transmitting server 5 receives data from the relay server 2 indicating absence of a data transmission request ("YES" at step 44 in FIG. 6) without receiving a data transmission request from the relay server 2 ("NO" at step 42), query data is transmitted from the data transmitting server 5 to the relay server 2 again without clocking of the prescribed time period by the timer in the data transmitting server 5. In a case where there is no data transmission request from the mobile telephone 1, the query data is transmitted from the data transmitting server 5 to the relay server 2 immediately without elapse of the prescribed time period in the data transmitting server 5. The relay server 2, therefore, waits from a data transmission request from the mobile telephone 1. In a case where there is a data transmission request from the mobile telephone 1, this data transmission request can be transferred from the relay server 2 to the data transmitting server 5 immediately. Data conforming to the data transmission request can therefore be transmitted from the data transmitting server 5 to the mobile telephone 1 rapidly.

In accordance with this embodiment, since there is no data communication between the relay server 2 and mobile telephone 1 if there is no data transmission request from the mobile telephone 1, needless communication can be prevented. Further, when there is a data transmission request from the mobile telephone 1, the requested data can be transmitted to the mobile telephone 1 immediately.

In the above-described embodiment, the mobile telephone 1 and relay server 2 communicate data. However, data may be communicated with the relay server 2 using another data terminal and not just the mobile telephone 1.

In a case where there is a data transmission request from the mobile telephone 1 to the relay server 2, the time during which a data transmission in response to this request is allowed (this time will be referred to as "time-out time" below) generally differs depending upon the setup of the firewall 4. In order for the data transmitting server 5 and relay server 2 to estimate the time-out time of the firewall 4, the data transmitting server 5 and relay server 2 can cooperate to gradually extend the time interval between a request and a response by the data transmitting server 5 and relay server 2 (the clocking time in the relay server 2), and the data transmitting server 5 can infer that the time at which it has stopped receiving any response from the relay server 2 is the time-out time and decide upon a time (let this be a time T), which is closest to the time-out time, at which a response could be received. By inferring the time-out time of the data transmitting server 5 and communicating the time T from the data transmitting server 5 to the relay server 2, the clocking time by the relay server 2 is adjusted to the time T. In this way a clocking time in the relay server 2 that is optimum for the firewall 4 can be decided and the number of times communication from the data transmitting server 5 to the relay server 2 is performed in a unit time can be minimized when there are absolutely no data transmission requests from the mobile telephone 1 to the relay server 2.

As many apparently widely different embodiments of the present invention can be made without departing from the spirit and scope thereof, it is to be understood that the invention is not limited to the specific embodiments thereof except as defined in the appended claims.

What is claimed is:

1. A relay server comprising;
    a timekeeping device which, in accordance with receipt of query data, which is transmitted from a data transmitting server and queries as to the existence of a data transmission request from a data terminal that has been authenticated, via a port of a firewall which allows a data transmission from the data transmitting server to the relay server but which allows data communication from the relay server to the data transmitting server during a fixed period of time in response to transmission of data from the data transmitting server to the relay server, is for starting clocking of the fixed time period;
    a determination device, responsive to receipt of the query data transmitted from the data transmitting server, for determining whether there has been a data transmission request from the data terminal during the clocking of the fixed time period by said timekeeping device;
    a first transfer device, responsive to a determination by said determination device that there has been a data transmission request from the data terminal, for transferring the data transmission request from the data terminal to the data transmitting server;
    a second transfer device for transferring, to the data terminal, data requested by the data terminal transmitted from the data transmitting server in response to transfer of the data transmission request from the data terminal to the data transmitting server by the first transfer device; and
    a transmitting device, responsive to end of clocking of the fixed time period by said timekeeping device without a data transmission request from the data terminal being determined by said determination device, for transmitting data, which indicates absence of a data transmission request from the data terminal, to the data transmitting server.

2. The relay server according to claim 1, wherein the query data is transmitted from the data transmitting server to the relay server based upon https via port 443 of the firewall.

3. A method of controlling operation of a relay server, comprising the steps of:
    in accordance with receipt of query data, which is transmitted from a data transmitting server and queries as to the existence of a data transmission request from a data terminal that has been authenticated, via a port of a firewall which allows a data transmission from the data transmitting server to the relay server but which allows data communication from the relay server to the data transmitting server during a fixed period of time in response to transmission of data from the data transmitting server to the relay server, starting clocking of the fixed time period;
    in response to receipt of the query data transmitted from the data transmitting server, determining whether there has been a data transmission request from the data terminal during the clocking of the fixed time period;
    in response to a determination that there has been a data transmission request from the data terminal, transferring the data transmission request from the data terminal to the data transmitting server;
    transferring, to the data terminal, data requested by the data terminal transmitted from the data transmitting server in response to transfer of the data transmission request from the data terminal to the data transmitting server; and
    in response to end of clocking of the fixed time period without a data transmission request from the data terminal being determined, transmitting data, which indicates absence of a data transmission request from the data terminal, to the data transmitting server.

4. A computer-readable program embodied on a non-transitory computer readable medium for controlling operation of a relay server so as to:
    in accordance with receipt of query data, which is transmitted from a data transmitting server and queries as to the existence of a data transmission request from a data terminal that has been authenticated, via a port of a firewall which allows a data transmission from the data transmitting server to the relay server but which allows data communication from the relay server to the data transmitting server during a fixed period of time in response to transmission of data from the data transmitting server to the relay server, cause timekeeping means to clock the fixed time period;
    in response to receipt of the query data transmitted from the data transmitting server, execute determination processing for determining whether there has been a data transmission request from the data terminal during the clocking of the fixed time period by the timekeeping means;

in response to a determination by the determination processing that there has been a data transmission request from the data terminal, transfer the data transmission request from the data terminal to the data transmitting server;

transfer, to the data terminal, data requested by the data terminal transmitted from the data transmitting server in response to transfer of the data transmission request from the data terminal to the data transmitting server; and in response to end of clocking of the fixed time period by the timekeeping means without a data transmission request from the data terminal being determined by the determination processing, transmit data, which indicates absence of a data transmission request from the data terminal, to the data transmitting server.

* * * * *